(12) United States Patent
Górski et al.

(10) Patent No.: US 11,566,679 B2
(45) Date of Patent: Jan. 31, 2023

(54) BUMPER CAP FOR DAMPER

(71) Applicant: DRiV Automotive Inc., Lake Forest, IL (US)

(72) Inventors: Tomasz Górski, Laziska Górne (PL); Grzegorz Franciszek Burzawa, Tychy (PL)

(73) Assignee: DRiV Automotive Inc., Southfield, MI (US)

( * ) Notice: Subject to any disclaimer, the term of this patent is extended or adjusted under 35 U.S.C. 154(b) by 84 days.

(21) Appl. No.: 17/088,382

(22) Filed: Nov. 3, 2020

(65) Prior Publication Data
US 2022/0136581 A1    May 5, 2022

(51) Int. Cl.
*F16F 9/32* (2006.01)
*F16F 9/19* (2006.01)
(Continued)

(52) U.S. Cl.
CPC ............. *F16F 9/3242* (2013.01); *F16F 9/19* (2013.01); *F16F 9/3271* (2013.01); *F16F 9/36* (2013.01);
(Continued)

(58) Field of Classification Search
CPC .......... F16F 9/3242; F16F 9/19; F16F 9/3271; F16F 9/36; F16F 2222/12; F16F 2224/02;
(Continued)

(56) References Cited

U.S. PATENT DOCUMENTS

| 4,364,457 A | * | 12/1982 | Wossner | ............... F16F 9/3242 267/217 |
| 4,527,673 A | * | 7/1985 | Szcupak | ................. F16J 15/56 188/269 |

(Continued)

FOREIGN PATENT DOCUMENTS

| CN | 202756530 U | 2/2013 |
| CN | 206206471 U | 5/2017 |

(Continued)

OTHER PUBLICATIONS

Notification of Transmittal of the International Search Report and the Written Opinion of the International Searching Authority regarding International Application No. PCT/US2021/057726 dated Feb. 14, 2022 (27 pages).

*Primary Examiner* — Robert A. Siconolfi
*Assistant Examiner* — James K Hsiao
(74) *Attorney, Agent, or Firm* — DRiV Automotive Inc.

(57) ABSTRACT

A bumper cap for a damper, the damper including an outer tube with a tube end. A rod extending through the tube end. The damper including a damping fluid, such as a hydraulic oil, that is movable within the damper in response to movement of the rod to provide a damping effect. The bumper cap has a cup shaped body having a side wall and a base, the side wall having an inner surface and an outer surface, the inner surface having a dimension that is sized to be press fit over the outer tube. The base of the bumper cap has a through hole in the base, the through hole configured to have the rod pass therethrough. The base has at least one (Continued)

fluid passage extending away from the through hole that is in fluid communication with a fluid reservoir in the side wall.

18 Claims, 5 Drawing Sheets

(51) Int. Cl.
 *B60G 13/08*  (2006.01)
 *F16F 9/36*  (2006.01)
(52) U.S. Cl.
 CPC .......... *B60G 13/08* (2013.01); *B60G 2202/24* (2013.01); *B60G 2206/41* (2013.01); *B60G 2206/71* (2013.01); *B60G 2206/7105* (2013.01); *B60G 2206/81012* (2013.01); *B60G 2206/82092* (2013.01); *B60G 2800/162* (2013.01); *F16F 2222/12* (2013.01); *F16F 2224/02* (2013.01); *F16F 2224/0208* (2013.01); *F16F 2224/0275* (2013.01); *F16F 2226/04* (2013.01); *F16F 2226/045* (2013.01); *F16F 2230/30* (2013.01); *F16F 2234/02* (2013.01)
(58) Field of Classification Search
 CPC ....... F16F 2224/0208; F16F 2224/0275; F16F 2226/04; F16F 2226/045; F16F 2230/30; F16F 2234/02; B60G 13/08; B60G 2202/04; B60G 2206/41; B60G 2206/71; B60G 2206/7105; B60G 2206/81012; B60G 2206/82092; B60G 2800/162
 See application file for complete search history.

(56) References Cited

U.S. PATENT DOCUMENTS

| | | | |
|---|---|---|---|
| 4,609,082 A | | 9/1986 | Itzinger et al. |
| 5,125,681 A | * | 6/1992 | Brackette, Jr. ... B60G 17/01933 |
| | | | 280/DIG. 1 |
| 5,176,229 A | * | 1/1993 | Kanari .................... F16F 9/364 |
| | | | 188/315 |
| 5,533,598 A | * | 7/1996 | Adrian .................... F16F 9/363 |
| | | | 188/322.17 |
| 5,776,043 A | * | 7/1998 | Kato .................. G03G 15/2025 |
| | | | 492/54 |
| 5,878,851 A | | 3/1999 | Carlson et al. |
| 6,105,739 A | * | 8/2000 | Deppert ............... F16J 15/3224 |
| | | | 92/167 |
| 6,158,559 A | * | 12/2000 | Asa ........................ F16C 29/084 |
| | | | 267/64.11 |
| 6,199,844 B1 | * | 3/2001 | McCormick ....... B60G 21/0551 |
| | | | 267/221 |
| 6,659,243 B2 | * | 12/2003 | Yasuda .................... F16F 9/062 |
| | | | 188/322.19 |
| 7,771,543 B2 | * | 8/2010 | Bang .................... A47L 15/4225 |
| | | | 134/184 |
| 7,810,619 B2 | * | 10/2010 | Maeda ....................... F16F 9/58 |
| | | | 188/322.17 |
| 8,991,572 B2 | * | 3/2015 | Wang ........................ F16F 9/36 |
| | | | 188/315 |
| 9,022,188 B2 | * | 5/2015 | Lee ........................... F16F 9/36 |
| | | | 188/322.17 |
| 10,309,478 B2 | * | 6/2019 | Choi ......................... F16F 9/36 |
| 10,539,203 B2 | * | 1/2020 | Kunkel .............. B60G 17/0182 |
| 10,794,447 B2 | * | 10/2020 | Kato ....................... F16F 9/366 |
| 10,816,055 B2 | * | 10/2020 | Górski ...................... F16F 9/36 |
| 2003/0024780 A1 | * | 2/2003 | Yasuda .................... F16F 9/363 |
| | | | 188/322.17 |
| 2009/0194379 A1 | * | 8/2009 | Maeda .................. F16F 9/3242 |
| | | | 188/322.22 |
| 2011/0048225 A1 | * | 3/2011 | Yoshida .................. F16F 9/364 |
| | | | 92/169.1 |
| 2011/0048879 A1 | | 3/2011 | Wang |
| 2011/0198226 A1 | * | 8/2011 | Horsthemke .......... C25D 21/04 |
| | | | 205/88 |
| 2014/0232081 A1 | * | 8/2014 | Gleason ................. B60G 7/001 |
| | | | 280/124.125 |
| 2016/0084336 A1 | * | 3/2016 | Tsunekawa ............. F16F 9/585 |
| | | | 188/322.12 |
| 2016/0097483 A1 | * | 4/2016 | Irwin ..................... F16M 13/02 |
| | | | 248/94 |
| 2018/0051767 A1 | * | 2/2018 | Tanabe .................. F16F 9/3235 |
| 2018/0320752 A1 | * | 11/2018 | Kato ......................... F16F 9/36 |
| 2019/0170205 A1 | * | 6/2019 | Wichary ................... F16F 9/18 |
| 2019/0178327 A1 | * | 6/2019 | Kunkel ................. F16F 9/3292 |
| 2019/0331192 A1 | * | 10/2019 | Górski ...................... F16F 9/38 |
| 2019/0390730 A1 | * | 12/2019 | Russell ................ B60G 13/008 |

FOREIGN PATENT DOCUMENTS

| | | |
|---|---|---|
| CN | 208348378 U | 1/2019 |
| DE | 10138196 C1 | 10/2002 |
| DE | 102009030591 B4 | 5/2015 |
| DE | 102014217836 A1 | 3/2016 |
| DE | 102019203367 A1 | 10/2020 |
| EP | 2443363 B1 | 3/2014 |
| KR | 19990049120 A | 7/1999 |
| KR | 20080081403 A | 9/2008 |
| KR | 20150082846 A | 7/2015 |
| KR | 101756419 B1 | 7/2017 |

* cited by examiner

BUMPER CAP FOR DAMPER

BACKGROUND

Dampers generally include a piston and rod arrangement within a tube. The tube includes a hydraulic oil that resists movement of the rod thereby providing a dampening effect. The tube has a rod guide oil seal can lose its functionality because of natural wear, piston rod damage or any possible damage to the rod guide. The purpose of the rod guide seal is to the hydraulic oil in the damper. The rod guide seal, or piston rod may also not function properly due to environmental impacts for example by dirt contamination. Where the rod guide seal or rod is not functioning properly, there may be a leakage of hydraulic oil. The prior art may provide a bumper cap that is generally cup shaped and slides over the top of the damper to protect the rod guide oil seal. These prior art bumper caps include ribs on their interior surface to facilitate fitting the bumper cap over the damper end.

Dampers may also exhibit static oil leakage where very small amount of oil continuously passes through the rod guide seal as a result of pores on the surface of the rod. For example, where the surface of the rod is chrome plated, it is known that chrome includes micro pores. Hydraulic oil can be captured in the pores and as the rod leaves the damper, the oil can leave the pores and drip down the rod as pass through the space between the ribs on the bumper cap and damper. While the amount of oil that escapes the damper as a result of the pores in the rod is small, it can nonetheless provide an incorrect impression that oil is leaking from the damper insofar as the hydraulic oil that is released from the pores on the rod can streak down the exterior side of the damper. The prior art provides bumper caps which can capture the hydraulic oil from the pores in the rod. A need has arisen to provide an improved bumper cap.

DETAILED DESCRIPTION

The present disclosure relates to a bumper cap for a damper. Dampers include a rod and piston movable in a tube. Dampers can include an outer tube and an inner tube. The tubes include a damping fluid, typically an oil, for example a hydraulic oil, which resists movement of the rod and piston thereby creating a dampening effect as is known in the art. Damper types vary widely, including mono tube dampers, twin tube dampers, semi active dampers and fully active dampers. As the rod moves into and out of the outer tube, the oil can be captured in the pores of the surface of the rod. During use, and over time, small amounts of the oil can become captured on the surface of the rod and give an incorrect impression that the damper is leaking. A cup shaped bumper cap is disclosed herein that captures oil that may escape the damper as a result of static leakage. The disclosed bumper cap may be press fit over the outer tube at the rod end and provides an integrated fluid reservoir that captures the oil that may be captured and drip from the surface of the rod. The fluid reservoir is located in a side wall of the bumper cap. The disclosed bumper cap includes a base have a fluid passage which is in fluid communication with the base of the disclosed bumper cap.

Figure 1:
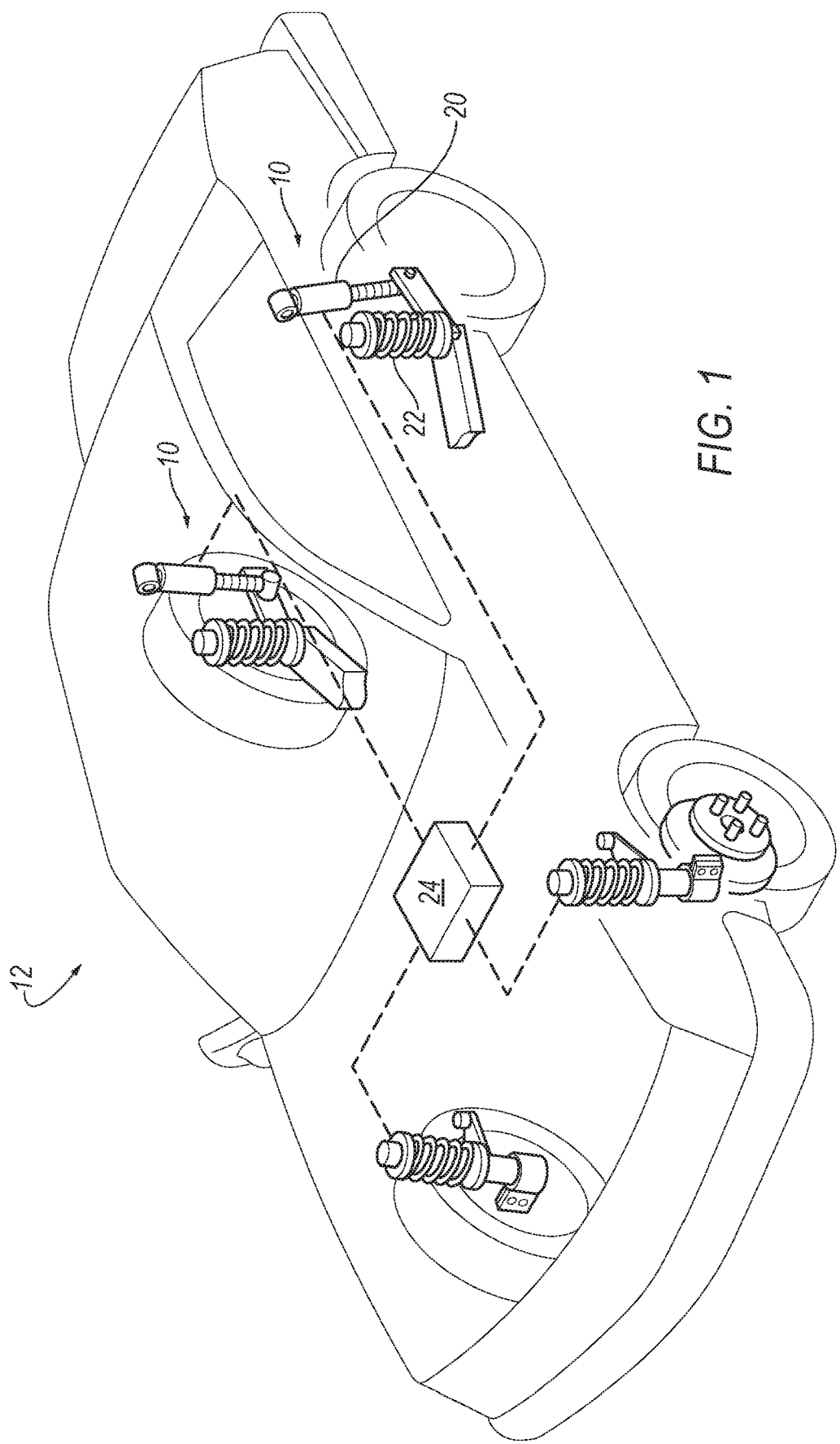
FIG. 1 is a schematic view of a representative vehicle with a plurality of dampers.

With reference to FIG. 1 there is shown a vehicle 12 having a suspension system 10 and a body. Suspension system 10 includes dampers 20 and coil springs 22. Dampers 20 may be passive, semi-active or active. Active and semi-active dampers may have damping levels controlled by an Electronic Control Unit (ECU) 24.

Figure 2:
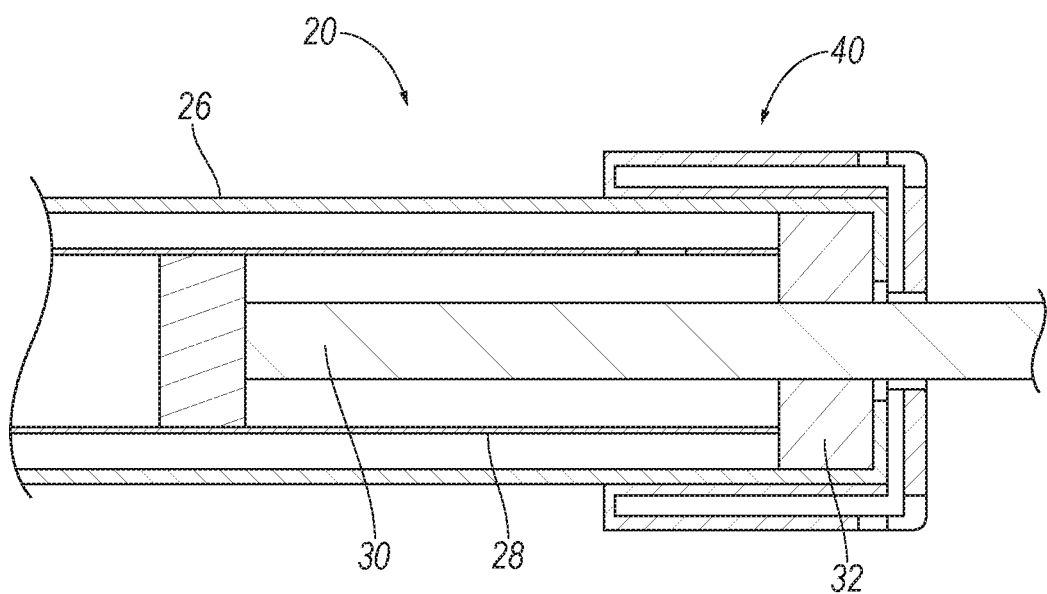
FIG. 2 is a representative view of a damper.

With reference to FIG. 2 there is shown a partial cross-sectional view of an exemplary damper 20. The damper 20 includes the outer tube 26 and the inner tube 28 disposed in the outer tube 26. As shown the inner tube 26 and the outer tube 28 are concentric. The damper 20 includes a hydraulic fluid, for example a hydraulic oil, movable within the damper to provide a damping effect.

The dampener 20 includes a piston and a rod 30. The piston is contained in the inner tube 28 and the rod 30 extends externally of outer tube 26 through a rod guide oil seal 32. During use, the rod 30 slides into and out of the damper 20 during a compression stroke and a rebound stroke. A bumper cap 40 is fit over the outer tube 28 to protect the rod guide oil seal 32. As described below the bumper cap 40 also captures hydraulic oil that may escape the damper as a result of static oil leakage.

In the example shown, the rod 30 is plated with chrome. The chrome plating includes micro pores into which the hydraulic fluid may be captured and create static oil leakage. In static oil leakage the hydraulic fluid from the pores may seep from the pores when the rod 30 is external to the damper 20 and over time drip down the exterior of the damper 20 which may give an operator the incorrect impression that the damper is leaking. This incorrect impression may lead to unnecessary service requests.

Figure 3:
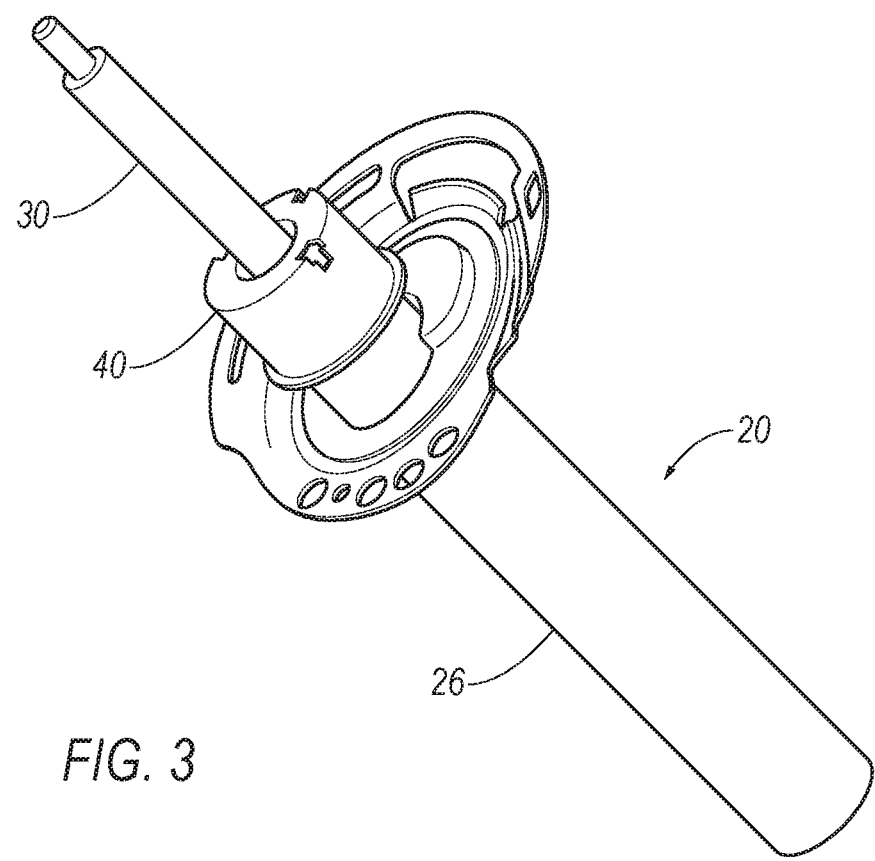
FIG. 3 is a perspective view of a damper with bumper cap.

With reference to FIG. 3 there is shown an external perspective view of the damper 20 with the bumper cap 40.

Figure 4:
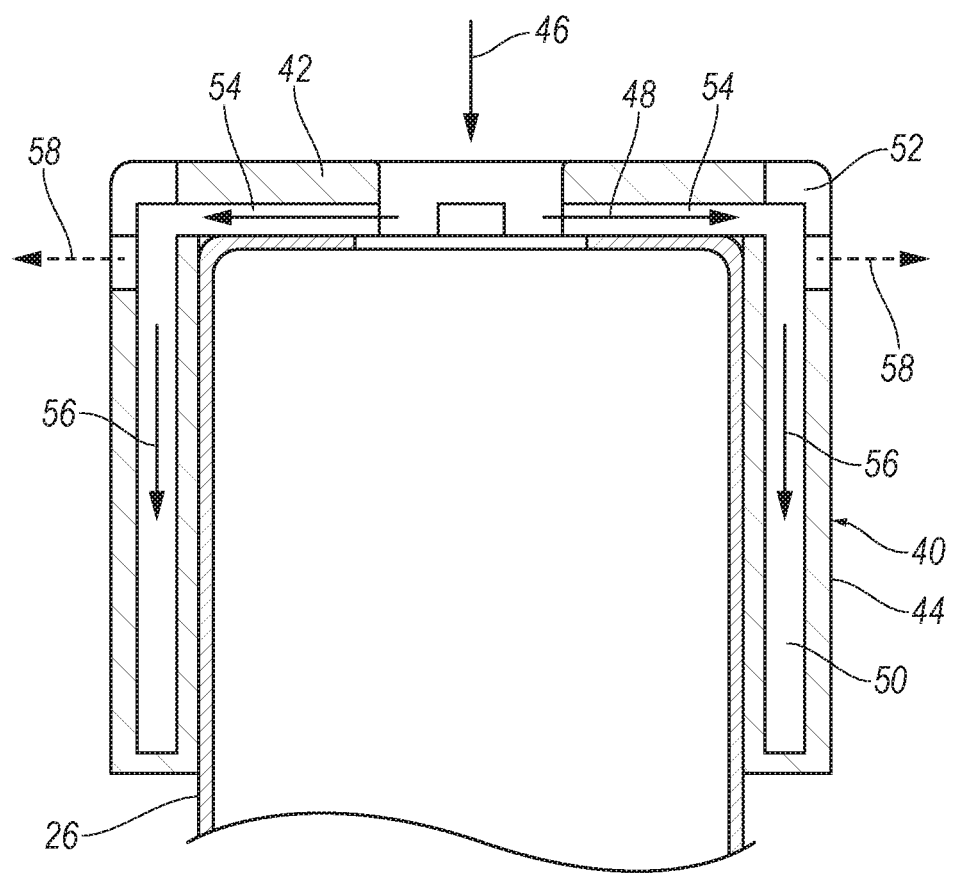
FIG. 4 is a cross sectional view of a damper with a bumper cap.

With reference to FIG. 4 there is shown a cross section of the bumper cap as fitted upon a damper 20. The bumper 40 cap has a generally cup shaped body and is compression fit over the top or end of the damper 20. The bumper cap includes a base 42 and a continuous side wall 44.

The bumper cap 40 includes a top rod aperture 46 through which the rod 30 passes. In the exemplary embodiment a small clearance is provided between the rod 30 and the rod aperture 46 aperture and the rod 30 so that the bumper cap 40 does not mechanically interfere with the rod 30. It is understood that FIG. 4 does not illustrate the rod or the rod guide.

The base 42 includes at least one fluid passage 48 that is fluidly connected to at least one fluid reservoir 50 in the side wall 44. As the hydraulic oil escapes the pores of the rod 30 as a result of static oil leakage the hydraulic oil passes into the fluid passages 48 and flows into the fluid reservoir 50 on the side wall 44. Increased capacity to capture fluid captured in the pores of the rod may be provided by adding more fluid passages and more fluid reservoirs, or by making the side walls comparatively thicker or longer.

A ventilation opening 52 may be provided at the intersection of the base 42 and the side wall 44. The base 42 has at least one, and as illustrated in the exemplary figures four, fluid passages 48 that extend radially outward from the rod aperture 46. Each fluid passage 48 is fluidly connected to a fluid reservoir 50 located in the side wall 44. It is understood that the any number of fluid passages 48 and fluid reservoirs 50 may be provided and the four passages 48 that are illustrated are exemplary. As shown, each fluid passage has a corresponding fluid reservoir. As shown in FIG. 4, each fluid passage in the base includes an associated ventilation opening 52. In the circumstance where the fluid reservoir 50 is full, hydraulic oil can pass into the environment through the ventilation opening 52. The volume of the fluid reservoirs 50 may be determined to have a value corresponding to the amount of static oil leakage that damper 20 can accommodate, with some dampers capable of a greater amount of static oil leakage than other dampers.

The ventilation opening 42 may be located at the intersection of the base 42 and the side wall 44. As shown, the ventilation opening 52 is larger in the base 42 than the side wall 44. The ventilation opening 52 assures that all the captured hydraulic oil resides in the side walls of the bumper cap 40. The side walls 44 of the bumper cap 40 may be increased on length to provide a greater volume of available space for the fluid reservoir 50.

During operation when oil is captured in the pores of the rod 30 and carried externally to the damper 20, the oil falls from the pores into the fluid passages 48 of the base 42 as shown by arrow 54. The oil then falls into fluid reservoirs 50 in the side wall 44 as shown by arrow 56. In this way, the small amount of hydraulic oil that escapes from the damper 20 does not provide the false impression that the hydraulic fluid is leaking from the damper 20. If the oil fills the fluid reservoirs 50, the oil can escape the bumper cap 40 through ventilation openings 52 as shown by dashed arrows 58.

Figure 5:
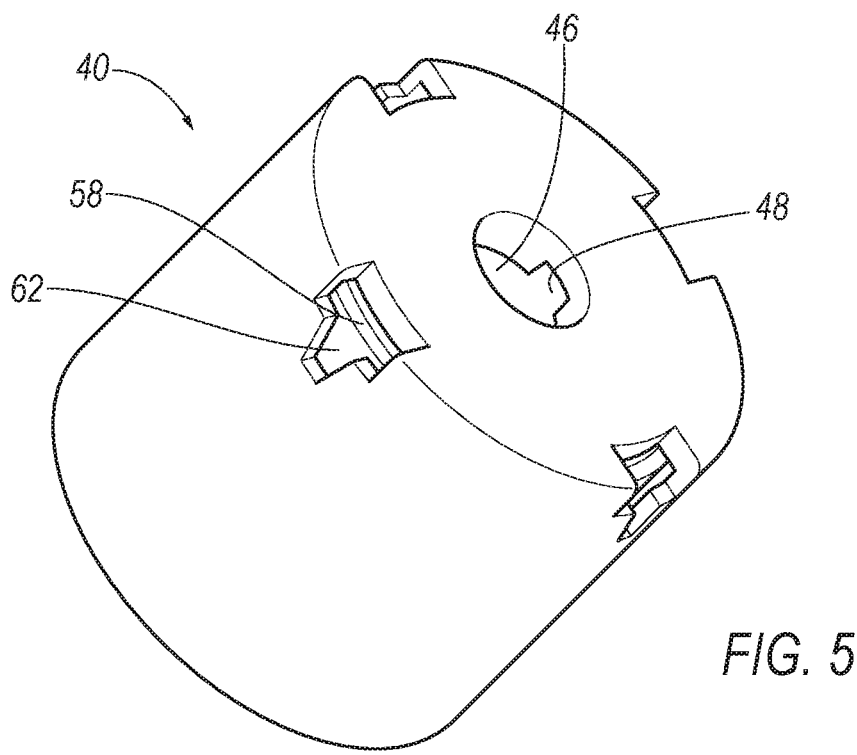
FIG. 5 is a perspective view of a bumper cap.

With reference to FIG. 5 there is shown a perspective view of bumper cap 40. As can be seen, fluid passage 48 is accessible adjacent rod aperture 46. As illustrated, a notch 62 may be provided adjacent to the ventilation opening 58. The notch 62 may have a smaller width than the ventilation opening 58. When the oil reaches the capacity of the fluid reservoirs 50, the oil will escape from the notch 62.

Figure 6:
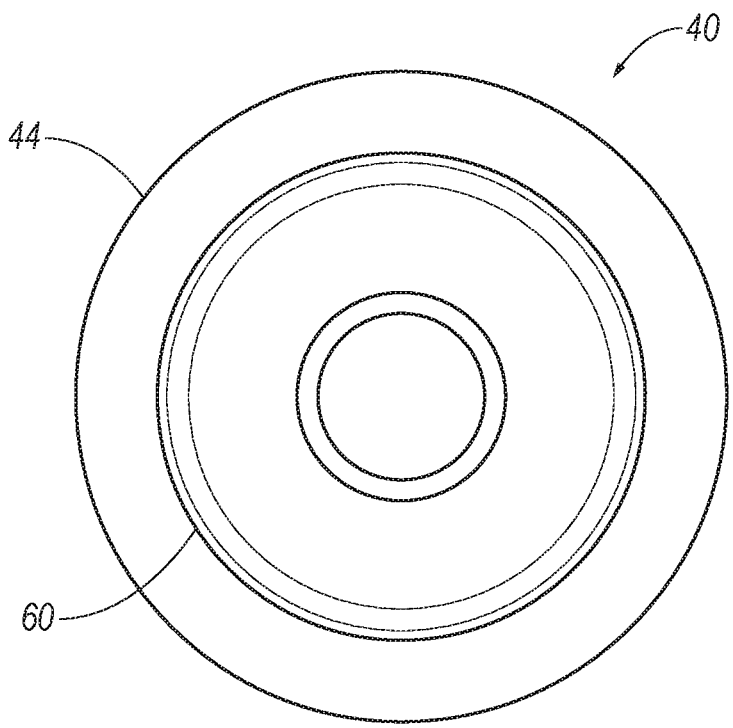
FIG. 6 is an end view of a bumper cap.

With reference to FIG. 6 there is shown an end view of the bumper cap 40. The bumper cap 40 includes a substantially smooth inner surface 60 sized to facilitate a press fit of the bumper cap 40 over the damper 20. By press fitting the bumper cap 40 over the damper 20 there is substantially no clearance between the bumper cap 40 and the outer damper wall 26, and the hydraulic oil cannot escape between the bumper cap 40 and the outer damper wall 26.

Figure 7:
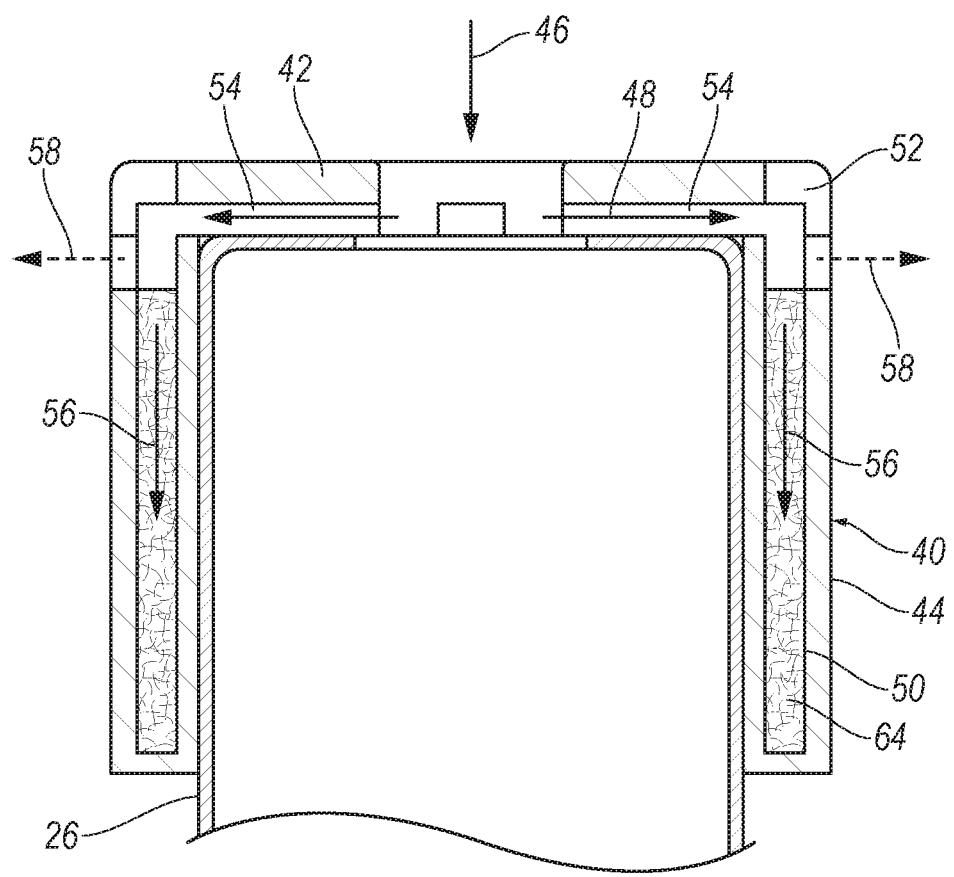
FIG. 7 is a cross section of a bumper cap with an oil absorbing material included.

With reference to FIG. 7 there is shown a bumper cap 40 including an oil absorbing material 64 in the oil reservoir 50. The disclosure provides the ability to place an oil absorbing material 64 in the fluid reservoir 50. The oil absorbing material 64 may be in the form of a foam, chemical or ceramic. One benefit of certain ceramic materials is their ability to absorb oil without absorbing water. By using certain oil absorbing materials, the disclosure provides a way to repel water from the oil reservoir. By including a material that repels water it is possible to reduce the inadvertent possibility that the oil reservoir 50 will be filled in part with water, caused unexpected exposures by water, for example launching a boat at a boat ramp.

The preferred construction of the bumper cap is by injection molding as a single piece from a polypropylene copolymer. Other suitable polymers may also be used.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A bumper cap for a damper, the damper including an outer tube, the outer tube having an end, and a rod extending through the end in the outer tube, the damper including a damping fluid that is movable within the damper in response to movement of the rod, the bumper cap comprising:
   a cup shaped body having a side wall and a base, the side wall having an inner surface and an outer surface, the inner surface having a dimension that is sized to be press fit over the outer tube and the base having a through hole in the base, the through hole configured to have the rod pass therethrough,
   the base having at least one fluid passage extending away from the through hole;
   the side wall having at least one fluid reservoir located in the side wall and in fluid communication with the fluid passage, the at least one fluid reservoir being radially between the inner surface and the outer surface of the side wall.

2. The bumper cap as in claim 1 further comprising at least one ventilation opening between the fluid passage and the fluid reservoir.

3. The bumper cap as in claim 2 including at least four fluid passages, and four fluid reservoirs, each fluid passage being in fluid communication with one of the fluid reservoirs.

4. The bumper cap as in claim 3 including at least four ventilation openings.

5. The bumper cap as in claim 2 wherein the ventilation opening is at a corner where the base meets the side wall.

6. The bumper cap as in claim 1 wherein the inner surface having the dimension that is sized to be press fit over the outer tube is smooth and abuts the outer tube.

7. The bumper cap as in claim 1 wherein an oil absorbing material is located in the oil reservoir.

8. The bumper cap as in claim 7 wherein the oil absorbing material is ceramic.

9. A damper comprising:
   an outer tube having an end; the outer tube having a rod, the rod extending through the end in the outer tube,
   the damper including a damper fluid, the damper fluid movable within the damper in response to movement of the rod;
   a cup shaped bumper cap configured to fit over the end of the outer tube, the bumper cap having a through hole, the rod passaging through the through hole,
   the cup shaped body having a side wall and a base, the side wall having an inner surface and an outer surface, the inner surface having a dimension that is sized to be press fit over the outer tube and the base having a through hole in the base, the through hole configured to have the rod pass therethrough,
   the base having at least one fluid passage extending away from the through hole;
   the side wall having at least one fluid reservoir located in the side wall and in fluid communication with the fluid passage, the at least one fluid reservoir is radially between the inner surface and the outer surface of the side wall.

10. The damper as in claim 9 wherein the rod includes a chrome surface.

11. The damper as in claim 10 further comprising a seal within the damper tube through hole, the seal configured to substantially prevent damping fluid from escaping the damper.

12. The damper as in claim 11 wherein the bumper cap further comprises at least one ventilation opening between the fluid passage and the fluid reservoir.

13. The damper as in claim 12 wherein the bumper cap further comprises and wherein the ventilation opening is at a corner where the base meets the side wall.

14. The damper as in claim 10 wherein the bumper cap further comprises at least four fluid passages, and four fluid reservoirs, each fluid passage being in fluid communication with one of the fluid reservoirs.

15. The damper as in claim 14 wherein the bumper cap further comprises at least four ventilation openings.

16. The damper as in claim 9 where the bumper cap is injection molded from a polymer.

17. The damper as in claim 16 wherein the inner surface having the dimension that is sized to be press fit over the outer tube is smooth and abuts the outer tube.

18. The damper as in claim 9 wherein the bumper cap includes an oil absorbing material in the oil reservoir.

* * * * *